United States Patent [19]
Clenet

[11] Patent Number: 5,005,899
[45] Date of Patent: * Apr. 9, 1991

[54] VEHICLE TRANSPARENT ROOF HAVING MANUALLY OPERABLE SUNSHADE

[75] Inventor: Alain J.-M. Clenet, Santa Barbara, Calif.

[73] Assignee: Asha Corporation, Santa Barbara, Calif.

[*] Notice: The portion of the term of this patent subsequent to May 8, 2007 has been disclaimed.

[21] Appl. No.: 518,576

[22] Filed: May 2, 1990

Related U.S. Application Data

[63] Continuation-in-part of Ser. No. 313,795, Feb. 22, 1989, Pat. No. 4,923,244, and a continuation-in-part of Ser. No. 220,785, Jul. 19, 1988, abandoned.

[51] Int. Cl.$^5$ .............................................. B60J 7/00
[52] U.S. Cl. ...................................... 296/214; 296/215
[58] Field of Search .............................. 296/214, 215

[56] References Cited

U.S. PATENT DOCUMENTS

| | | |
|---|---|---|
| 817,562 | 4/1906 | Holden . |
| 1,393,405 | 10/1921 | Soteros et al. . |
| 1,425,484 | 8/1922 | Jenkins . |
| 1,427,038 | 8/1922 | Toadvine . |
| 1,441,501 | 1/1923 | Mein . |
| 1,455,475 | 5/1923 | Bullock . |
| 1,637,763 | 8/1927 | Clegg . |
| 2,248,538 | 10/1940 | Liebler . |
| 2,328,263 | 8/1943 | Stefano . |
| 2,561,188 | 7/1951 | Ferguson . |
| 2,580,776 | 1/1952 | Herman . |
| 2,723,714 | 11/1955 | Moore . |
| 2,855,241 | 10/1958 | Walter . |
| 2,874,770 | 2/1959 | Rohr et al. . |
| 2,921,628 | 1/1960 | Alvarez . |
| 2,927,819 | 3/1960 | Johnson . |
| 2,973,990 | 3/1961 | Werner . |
| 3,183,033 | 5/1965 | Stulbach . |
| 3,363,666 | 1/1968 | Hodgson et al. . |
| 3,412,506 | 11/1968 | Shiota . |
| 3,584,910 | 6/1971 | Lupul . |
| 3,964,784 | 6/1976 | Prechter et al. ................. 49/372 X |
| 4,018,476 | 4/1977 | Lutz et al. ........................ 49/634 X |
| 4,157,845 | 6/1979 | Queveau ........................ 160/188 X |
| 4,175,784 | 11/1979 | Schatzler et al. . |
| 4,220,189 | 9/1980 | Marquez . |
| 4,274,672 | 6/1981 | Kuroda .............................. 296/216 |
| 4,312,533 | 1/1982 | Jardin et al. ........................ 296/214 |
| 4,320,921 | 3/1982 | Schatzler ............................ 296/213 |
| 4,335,773 | 6/1982 | Masi ................................. 160/120 X |
| 4,337,975 | 7/1982 | Tamamushi et al. ............... 296/215 |
| 4,428,412 | 1/1984 | Toro ......................... 160/DIG. 3 X |
| 4,458,739 | 7/1984 | Murray et al. . |
| 4,558,899 | 12/1935 | Chu et al. ................. 160/DIG. 3 X |

(List continued on next page.)

FOREIGN PATENT DOCUMENTS 2202806 10/1988 United Kingdom ................ 296/214

Primary Examiner—Dennis H. Pedder
Attorney, Agent, or Firm—Brooks & Kushman

[57] ABSTRACT

A vehicle sunshade roof construction (16) is disclosed as including a transparent roof panel (28) and a sunshade (32) for opening and closing the area below the transparent roof panel. The sunshade (32) includes a plurality of laterally elongated blades (34) connected by a flexible sheet-like shade (38) and utilized in association with a pair of roof mounted guides (40) that support the sunshade for movement between the closed and open positions. In the closed position, the blades (34) are spaced with the shade (38) extending therebetween; and in the open position, the blades (34) are stored in a single vertical stack with the shade (38) folded therebetween at a location that exposes the occupant compartment to the transparent roof panel (28). A front end (32f) of the sunshade includes a handle (41) that is manually grasped to move the sunshade between the closed and open positions. A coupling mechanism (42) of the sunshade includes releasable connections (43) for connecting and disconnecting to and from the blade ends to maintain the blades spaced from each other during movement to and from and while in the closed position as well as permitting the storage in the stacked relationship.

16 Claims, 3 Drawing Sheets

U.S. PATENT DOCUMENTS

| | | | |
|---|---|---|---|
| 4,597,430 | 7/1986 | Marquez | 160/269 |
| 4,610,292 | 9/1986 | Hausmann et al. | 160/120 |
| 4,638,844 | 1/1987 | Havashiguchi . | |
| 4,647,102 | 3/1987 | Ebrahimzadeh . | |
| 4,671,564 | 6/1987 | Sumida et al. | 296/214 |
| 4,674,789 | 6/1987 | Watjer et al. . | |
| 4,679,846 | 7/1987 | Lux et al. | 296/214 |
| 4,695,090 | 9/1987 | Draper | 296/216 |
| 4,702,297 | 10/1987 | Klompenburg | 160/271 |
| 4,702,518 | 10/1987 | Paerisch et al. | 296/217 |
| 4,707,018 | 11/1987 | Gavagan | 296/97.6 |
| 4,717,200 | 1/1988 | Kruger | 296/214 |
| 4,811,985 | 3/1989 | Kruger et al. | 296/214 |
| 4,923,244 | 5/1990 | Clenet | 296/214 |

VEHICLE TRANSPARENT ROOF HAVING MANUALLY OPERABLE SUNSHADE

CROSS REFERENCE TO RELATED APPLICATIONS

This application is a continuation-in-part of prior application Ser. No. 313,795 now U.S. Pat. No. 4,923,244 issued May 8, 1990, filed by Alain J-M Clenet on Feb. 22, 1989 under the title "Transparent Vehicle Roof Having Sunshade" as a continuation-in-part of abandoned application Ser. No. 220,785 which was filed on July 18, 1988 under the same title "Transparent Vehicle Roof Having Sunshade".

TECHNICAL FIELD

This invention relates to a sunshade roof construction for a vehicle including a transparent roof panel.

BACKGROUND ART

Vehicle bodies having a roof opening or other opening that is selectively closed and opened by a plurality of interconnected panels are disclosed by U.S. Pat. Nos. 817,562; 2,248,538; 2,973,990; and 4,157,845.

As disclosed by U.S. Pat. No. 4,695,090, the prior art also includes a vehicle roof opening that is selectively closed and opened by an externally retractable sunroof assembly that extends laterally in the closed position between upper edges of associated vehicle side doors with a door-to-door construction.

Conventional vehicle sunroofs are mounted within a roof opening that is located between side rails of the vehicle body roof and have previously included sunshades that enable the sunroof panel to be transparent so that the environment can be viewed from the occupant compartment while still providing shading from the sun when necessary. See, for example, U.S. Pat. Nos.: Pat. Nos.: 3,964,784; 4,018,476; 4,175,784; 4,274,672; 3,964,784; 4,018,476; 4,175,784; 4,274,672; 4,312,533; 4,320,921; 4,337,975; 4,671,564; 4,679,846; 4,702,518; and 4,717,200. Such sunshades are generally planar and limit the size roof opening which can be shaded or opened for viewing.

Other vehicle sunshades, sunshields, and anti-glare shields that are primarily utilized with vehicle windshields, side windows, or back windows are disclosed by U.S. Pat. Nos.: 1,427,038; 1,441,501; 1,455,475; 1,637,763; 2,328,263; 2,561,188; 2,723,714; 2,855,241; 2,874,770; 2,927,819; 3,183,033; 3,363,666; 3,412,506; 3,584,910; 4,335,773; 4,428,412; 4,558,899; 4,647,102; 4,707,018; and 4,674,789.

Architectural window sunshades having edges which are guided during movement between open and closed positions are disclosed by U.S. Pat. Nos.: 1,393,405; 1,425,484; 2,580,776; 2,921,628; 4,220,189; 4,458,739; 4,597,430; 4,610,292; 4,638,844; and 4,702,297.

DISCLOSURE OF INVENTION

An object of the present invention is to provide an improved sunshade roof construction that allows a vehicle occupant to view the environment through the roof while still permitting selective shading of the vehicle occupant from the sun through the roof even with relatively large roof viewing areas on relatively small roofs.

In carrying out the above object, a vehicle incorporating the invention includes a roof covering the occupant compartment and has a sunshade roof construction including a transparent roof panel through which the environment can be viewed from the occupant compartment. A sunshade is mounted below the transparent roof panel and includes a plurality of laterally elongated blades each of which has opposite ends. The sunshade also includes a flexible sheet-like shade that connects the blades. A pair of guides of the sunshade roof construction are supported below the transparent roof panel with each guide receiving one end of each blade to support the sunshade for movement between closed and open positions. In the closed position, the blades are spaced from each other below the transparent roof panel with the flexible shade extending between the blades to cooperate therewith in shading the occupant compartment from the transparent roof panel. In the open position, the blades are stored in a stacked relationship with all of the blades in a single vertical stack at a location that exposes the occupant compartment to the transparent roof panel and with portions of the flexible shade folded between the stacked blades. The sunshade has a front end including a handle that is manually grasped to move the sunshade between the closed and opened positions. A coupling mechanism of the roof construction includes releasable connections for connecting to the blade ends to maintain the blades spaced from each other during movement to and from and while in the closed position. These releasable connections of the coupling mechanism disconnect from certain blade ends upon movement to the open position to permit the storage of the blades in the stacked relationship with the portions of the flexible shade folded between the blades.

The sunshade roof construction as described above is capable of permitting relatively large viewing areas even on relatively small roofs due to the compact storage of the sunshade in the open position with the blades stacked as described and the flexible shade folded between the blades.

Each blade preferably has a generally rigid sheet-like construction which may be made of metal such as sheet aluminum. As disclosed, each blade includes a pair of end members secured to its sheet-like construction and supported by the associated guide for movement as the sunshade is manually moved between the closed and open positions.

In the preferred construction, the coupling mechanism includes a pair of elongated flexible tapes one of which is supported by one of the guides and the other of which is supported by the other guide, and each tape has a permanent connection to the front end of the sunshade. Each tape has apertures spaced along its length and the blade ends have projections that are received by the apertures in the tape to cooperate therewith in providing the releasable connections, and the coupling mechanism includes a pair of toothed sprockets each of which is meshed with one of the apertured tapes.

Each guide includes a storage section that receives the ends of the sunshade blades in the stacked relationship with the sunshade in the open position. Each guide storage section includes a ramp where the blade end projections are received within and withdrawn from the tape apertures to make and uncouple the releasable connections of the tapes to the blade ends of the sunshade. The blade end projections are received by the tape apertures to maintain the blades spaced from each other during movement to and from the closed position, and the blade end projections are withdrawn from the tape apertures at the ramps of the guide storage sections to permit storage of the blades in the stacked relationship with the sunshade in the open position.

Each tape in the preferred construction has small apertures that mesh with the associated sprocket and also has large apertures that receive the projections of the blade ends.

In the preferred construction, each guide has a horizontally opening groove that receives one of the tapes and that also receives the adjacent ends of the blades. Each guide also includes a tape stowage section that receives the associated tape with the sunshade in the stored open position.

The coupling shaft disclosed has a pair of shaft portions each of which has an outer end connected to one of the sprockets and an inner end located adjacent the inner end of the other shaft portion. The coupling shaft also includes a coupling that rotatively couples the inner ends of the shaft portions to each other. This coupling preferably includes a spring biaser that forces the shaft portions away from each other.

In the embodiment disclosed, the sunshade roof construction includes a vehicle roof having side rails that support the guides with the transparent roof panel extending between the roof side rails and with the sunshade located at the rear of the transparent panel in the stored open position.

The sunshade roof construction also preferably includes at least one tensioner connected to the flexible sheet-like shade to maintain a taut condition thereof in the closed position of the sunshade. This tensioner preferably includes a spring and a connector that extends between the spring and the flexible sheet-like shade with the spring connected to the vehicle so as to thereby be capable of maintaining the shade taut.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
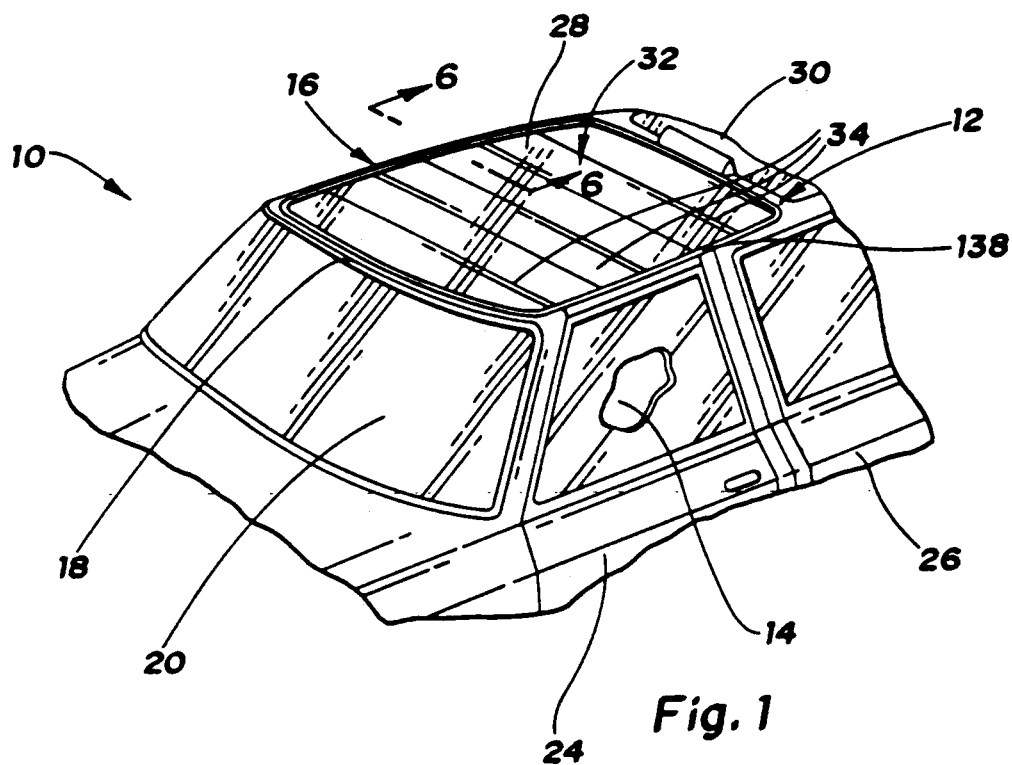
FIG. 1 is a partial perspective view of a vehicle including a sunshade roof construction according to the invention with a sunshade thereof illustrated in a closed position with respect to a transparent roof panel.
Figure 2:
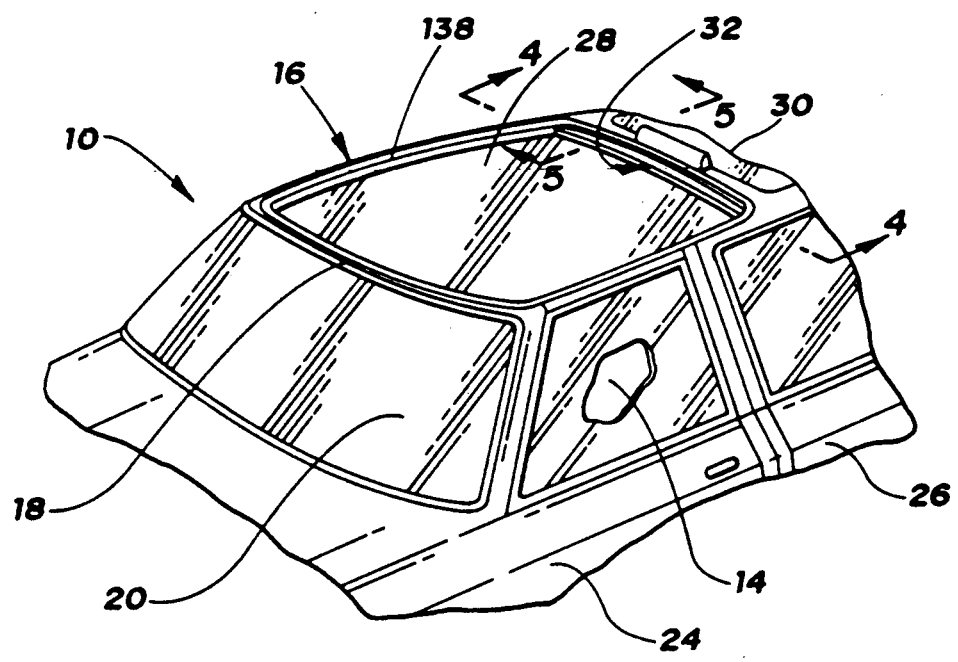
FIG. 2 is a partial perspective view similar to FIG. 1 but illustrating the sunshade in a stored open position with respect to the transparent roof panel.

With reference to FIGS. 1 and 2 of the drawings, a vehicle generally indicated by 10 includes a roof 12 that covers the occupant compartment 14 and includes a sunshade roof construction 16 in accordance with the present invention. This sunshade roof construction 16 is located just to the rear of the windshield header 18 which extends along the upper edge of the windshield 20 and is also located between the roof side rails 22 (FIGS. 3 and 6) that extend along the upper edges of the front and rear doors 24 and 26 when the invention is incorporated with a four-door sedan type vehicle as illustrated. However, it should also be appreciated that the invention can likewise be incorporated with two-door type vehicles. One advantage of the invention, as is hereinafter more fully described, is that the sunshade roof construction allows a greater area of viewing while still being stowable below the roof 12. Also, while the illustrated embodiment of the sunshade roof construction terminates at the windshield header 18, it is also possible for the sunshade roof construction to extend farther forwardly to provide shading of the windshield 20.

As shown by continued reference to FIGS. 1 and 2, the sunshade roof construction 16 includes a transparent roof panel 28 through which the environment can be viewed from the occupant compartment 14. This transparent roof panel 28 is illustrated as having a generally rectangular shape and occupies a major portion of the roof 12 extending along the windshield header 18, the side rails, and between the side rails at the rear end of the roof just forward of the rear window 30.

Figure 3:
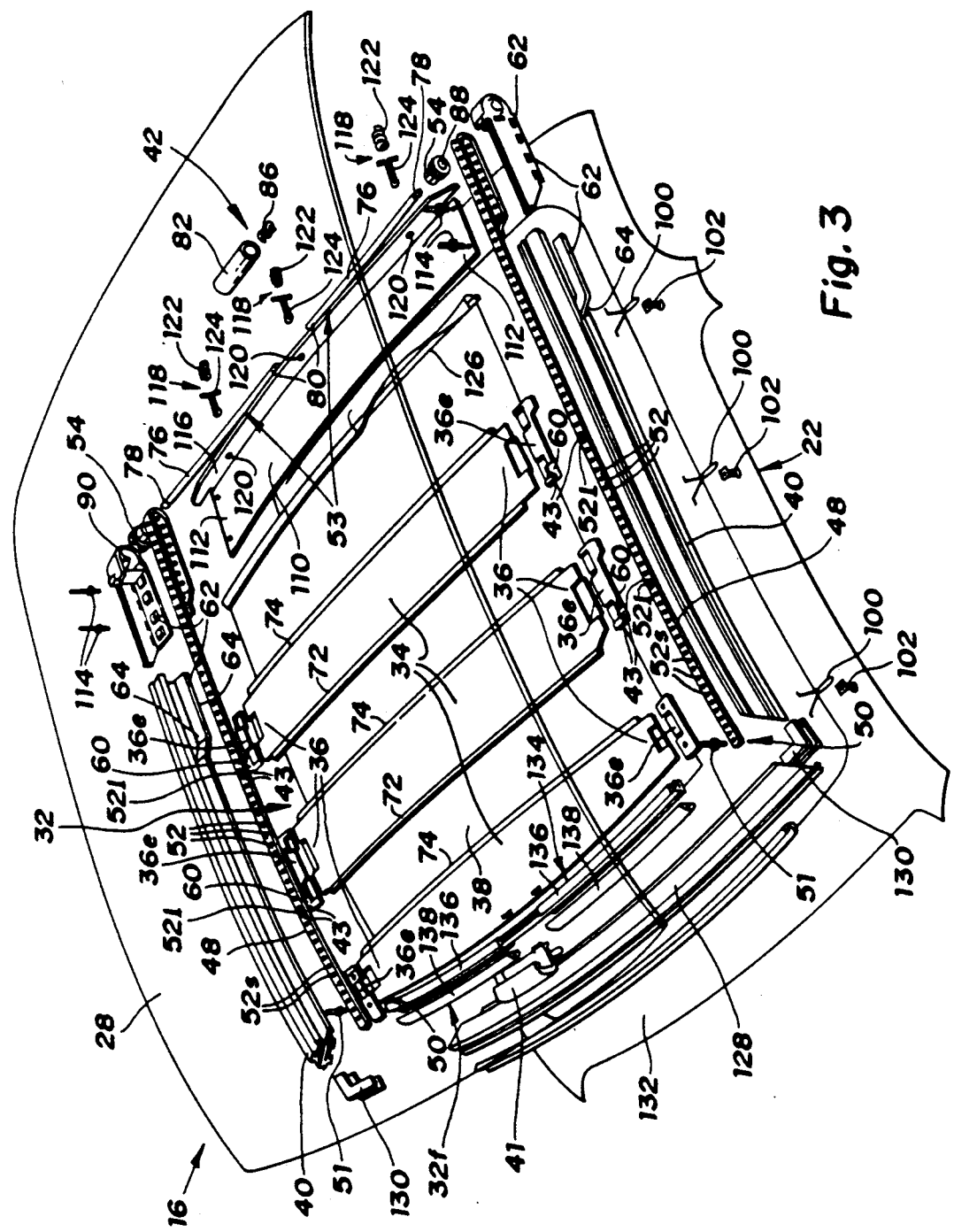
FIG. 3 is an exploded perspective view of the vehicle sunshade.

With combined reference to FIGS. 1 through 3, the sunshade roof construction 16 also includes a sunshade 32 mounted below the transparent roof panel 28 and includes a plurality of laterally elongated blades 34 each of which has opposite ends 36. Each of these blades 34 has a generally thin sheet-like construction which is most preferably made from sheet aluminum so as to have the requisite strength while still being relatively lightweight. Sunshade 32 also includes a flexible sheet-like shade 38 that connects the blades. A pair of guides 40 of the roof construction are illustrated in FIGS. 3 and 6 and are supported by the roof in a suitable manner extending along the roof side rails 22 with each guide receiving one end 36 of each blade 34 to support the sunshade for movement between the closed position of FIG. 1 and the open position of FIG. 2. In the closed position of FIG. 1, the blades 34 of the sunshade 32 are spaced from each other below the transparent roof panel 28 with the flexible shade 38 extending between the blades to cooperate therewith in shading the occupant compartment 14 from the transparent roof panel 28 and in also providing an insulative air layer below the roof panel. In the open position of FIG. 2, the blades 34 are stored in a stacked relationship in a single vertical stack as shown in FIG. 5 with certain portions of the flexible shade 38 folded therebetween at a location that exposes the occupant compartment to the transparent roof panel 28 so that the occupants can view the environment through the roof. The sunshade 32 has a front end 32f including a handle 41 (FIG. 3) that is manually grasped to move the sunshade between the closed position of FIG. 1 and the open position of FIG. 2. A coupling mechanism 42 of the sunshade roof construction includes releasable connections 43 for connecting to the blade ends 36 to maintain the blades 34 spaced from each other during movement to and from and while in the closed position. These releasable connections 43 of the coupling mechanism 42 disconnect from certain blade ends 36 upon movement to the open position to permit storage of the blades as shown in FIGS. 4 and 5 in the stacked relationship with portions of the flexible shade 38 folded between the blades.

As best illustrated in FIG. 3, the sunshade roof construction has each blade 34 provided with a pair of end members 36e secured to the sheet-like construction thereof and supported by the associated guide 40 for movement as the sunshade is manually moved by the handle 41 between the closed and open positions. These blade end members 36e are preferably injection molded from a suitable plastic and have fingers that provide a clamping connection to the associated blade end 36.

The coupling mechanism 42 includes a pair of flexible tapes 48 which are supported by the guides 40. Each tape 40 has a permanent connection 50 to the front end of the sunshade 32 such as by the fasteners 51 shown in FIG. 3. Each tape 40 also has apertures 52 spaced along its length. The coupling mechanism 42 includes a coupling shaft 53 that extends between the tapes and includes a pair of toothed sprockets 54 each of which is meshed with one of the apertured tapes. The ends 36 of the sunshade blades 34 have their end members 36a provided with projections 60 that are received by the apertures 52 in the tapes 48 to provide the releasable connections 43 of the tapes to the sunshade as hereinafter more fully described.

Figure 4:
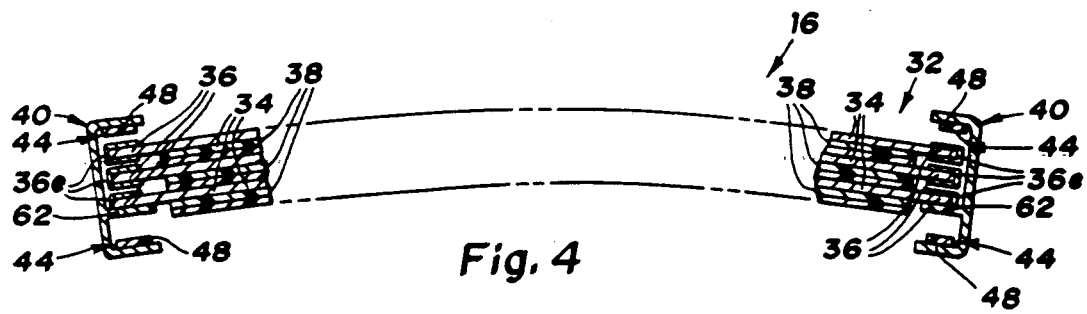
FIG. 4 is a sectional view taken along the direction of line 4—4 in FIG. 2 and illustrates the sunshade roof construction in its stored open position.
Figure 5:
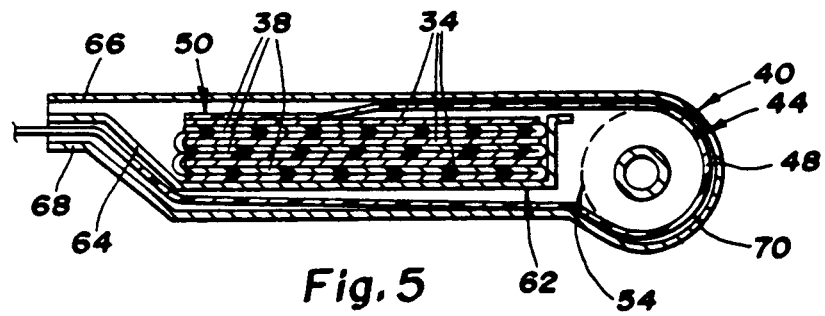
FIG. 5 is a sectional view taken along the direction of line 5—5 in FIG. 2 to illustrate the manner in which the sunshade is stored in the open position.
Figure 6:
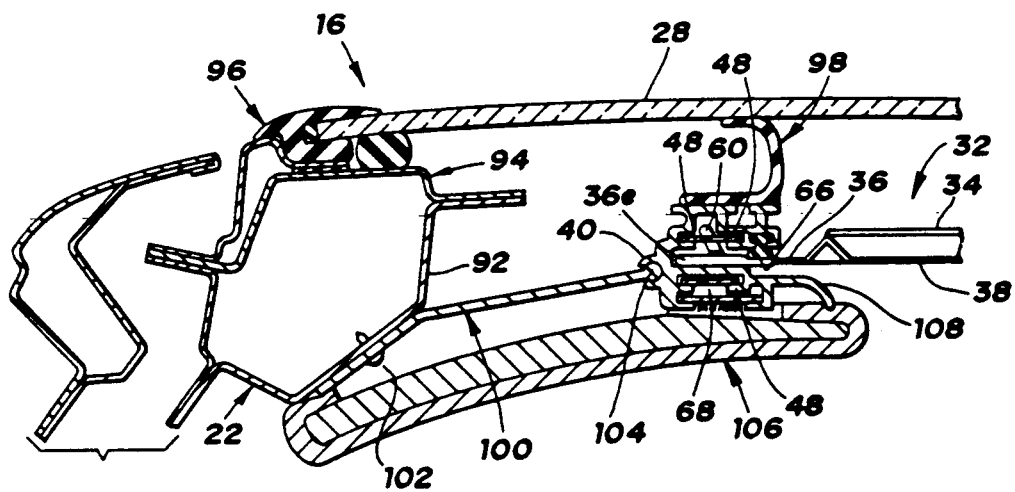
FIG. 6 is a sectional view taken along the direction of line 6—6 in FIG. 1 on an enlarged scale to further illustrate the sunshade roof construction of the invention.

As shown best in FIGS. 3, 4 and 5, each guide 40 includes a storage section 62 that receives the ends of the sunshade blades in a stacked relationship with the sunshade in the open position. In this stored position, the flexible shade 38 has certain of its portions folded between the vertically stacked blades 34 with a flattened S-shape between each adjacent pair of blades. Each guide storage section 62 includes a ramp 64 where the projections 60 of the ends 36 of all but the forwardmost blade 34 are received by and withdrawn from the drive tape apertures 52 to make and uncouple the releasable connections 43 of the tapes to the sunshade 32. The blade end projections 60 are received by the tape apertures 52 at the ramps 64 to maintain the rearward blades spaced from each other during movement to and from the closed position in order to thereby prevent the shade 38 from sagging downwardly as the sunshade is moved from the closed position to the open position. The rearward blade end projections 60 are withdrawn from the tape apertures 52 at the ramps 64 of the guide storage sections to permit the storage of the blades 34 in the stacked relationship shown in FIG. 5 with the sunshade in the open position of FIG. 2. As previously mentioned, the front end 32f of the sunshade 32 adjacent the forwardmost blade 34 has permanent connections 50 to the tapes 48 such as by the use of rivets or other suitable fasteners 51.

As best shown in FIG. 3, each tape 48 has small apertures 52s that mesh with the associated sprocket 54 of the coupling shaft 53 and also has large apertures 52l that receive the projections 60 of the blade ends 36 on the end members 36e. This construction prevents the rearward blades 34 from being prematurely pulled out of the storage section such as by manual upward pushing of the shade 38 that extends between the blades. In such instances, the larger projections 60 merely slide under the smaller apertures 52s until the tape is sufficiently driven outward to provide alignment thereof with the large apertures 52l.

As illustrated best in FIG. 6, each guide 40 has a horizontally opening groove 66 that receives one of the tapes 48 and the adjacent ends 36 of the sunshade blades 34 to provide support of the tape for movement of the sunshade between the closed and open positions. Each guide 40 also includes a tape stowage section 68 that receives the associated tape 48 with the sunshade in the stored open position. The tapes 48 each move through a return loop 70 (FIG. 5) within the storage section 62 while moving between the groove 66 and stowage section 68 shown in FIG. 6.

As shown in FIG. 3, each blade 34 has its sheet-like construction provided with front and rear flanges 72 and 74 that provide strengthening. It should also be appreciated that the blades can also be made with other constructions than sheet aluminum, such as bent wire covered by a fabric or sheet stock of other materials etc.

As illustrated in FIG. 3, the coupling shaft 53 includes a pair of shaft portions 76 each of which has an outer end 78 that is connected to one of the sprockets 54 and an inner end 80 located adjacent the inner end of the other shaft portion. A coupling 82 rotatively couples the inner ends 80 of the shaft portions 76 to each other. Both the outer and inner shaft portion ends 78 and 80 are preferably configured so as to be received within shaped openings in the associated sprocket 54 and the adjacent end of the coupling 82 so as to provide the rotational coupling of these components to each other. The coupling also preferably includes a spring biaser 86 that forces the shaft portions 76 away from each other and thereby facilitates the assembly and disassembly of the coupling shaft 53. Furthermore, this outward bias of the shaft portion 76 forces the sprockets 54 outwardly such that an outwardly facing opening 88 in each sprocket receives a support pin 90 of the associated guide storage section 62.

As shown in FIG. 6, the vehicle roof 12 has the guides 40 supported by its side rails 22 in any suitable manner such as on the inner rail member 92 of each side rail. The transparent roof panel 28 is supported by the outer rail member 94 by a suitable seal and mounting assembly collectively indicated by 96. A seal 98 is also mounted on the upper side of the guide 40 and seals against the lower surface of the transparent roof panel 28 inwardly from the side rail 22. Wire mounting clips 100 are secured by fasteners 102 to the inner rail member 92 as shown in FIG. 6 and have inner ends 104 that mount the associated guide 40. Also, a headliner section 106 extends between the inner rail member 92 and a flange 108 of the guide 40 so as to thereby cover the wire mounting clips 100 and provide anesthetically appearance.

As illustrated in FIG. 3, a storage tray 110 supports the sunshade 32 intermediate the ends of the blades 34 and has ends 112 that are secured by fasteners 114 to the storage sections 62 of the guides 40. A rear flange 116 of the storage tray extends upwardly. Tensioners 118, three of which are illustrated, extend through holes 120 in the storage tray flange 116 and are connected to the flexible sheet-like shade 38 of the sunshade to maintain a taut condition thereof in the closed position of the sunshade. More specifically, each tensioner includes a spring 122 and a connector 124. The spring 122 has a suitable connection to the vehicle and is also connected to the rear end of the connector 124 which extends through the associated hole 120 and has a front bifurcated end that is secured to a rod 126 that is received within a closed loop defined by the rear end 38r of the flexible sheet-like shade 38. Thus, the springs 122 of the tensioners pull the connectors 124 thereof rearwardly in order to maintain the taut condition of the shade 38 in the closed position.

With continuing reference to FIG. 3, a fixed sunshade header 128 extends between the front ends of the guides 40 and is secured thereto by connectors 130 adjacent the windshield header 132. The front end 32f of the sunshade 32 has a movable header 134 including a pair of header members 136 and a pair of seal members 138 located on opposite sides of handle 41.

Best results are achieved when the sunshade 32 has reflective properties for reflecting the sun's radiation in the closed position so as to thereby prevent undesirable heating of the vehicle occupant compartment. This is advantageously achieved by providing the shade 38 with an upper surface of plastic on which there is a reflective film in combination with the aluminum blades 34 which may be polished and/or provided with a reflective film to increase the reflection that prevents radiant heating.

It should also be appreciated that the transparent roof panel 28 may likewise have an outer reflective surface or tinting to eliminate objectionable direct sunlight while still permitting viewing through the roof.

While the best mode for carrying out the invention has been described in detail, those familiar with the art to which this invention relates will recognize various alternative designs and embodiments for carrying out the invention as defined by the following claims.

What is claimed is:

1. For use with a vehicle including a roof covering an occupant compartment, a sunshade roof construction comprising: a transparent roof panel through which the environment can be viewed from the occupant compartment; a sunshade mounted below the transparent roof panel and including a plurality of laterally elongated blades each of which has opposite ends; said sunshade also including a flexible sheet-like shade that connects the blades; a pair of guides supported below the transparent panel with each guide receiving one end of each blade to support the sunshade for movement between: a closed position where the blades are spaced from each other below the transparent roof panel with the flexible shade extending between the blades to cooperate therewith in shading the occupant compartment from the transparent roof panel, and an open position where the blades are stored in a stacked relationship with all of the blades located in a single vertical stack at a location that exposes the occupant compartment to the transparent roof panel and with portions of the flexible shade folded between the stacked blades; the sunshade having a front end including a handle that is manually grasped to move the sunshade between the closed and open positions; and a coupling mechanism including releasable connections for connecting to the blade ends to maintain the blades spaced from each other during movement to and from and while in the closed position, and the releasable connections of the coupling mechanism disconnecting from certain blade ends upon movement to the open position to permit the storage of the blades in the stacked relationship with the portions of the flexible shade folded between the blades.

2. A sunshade roof construction as in claim 1 wherein each blade has a generally rigid sheet-like construction.

3. A sunshade roof construction as in claim 2 wherein each blade includes a pair of end members secured to the sheet-like construction thereof and supported by the associated guide for movement as the sunshade is manually moved by the handle between the closed and open positions.

4. A sunshade roof construction as in claim 1 wherein the coupling mechanism includes a pair of elongated flexible tapes one of which is supported by one guide and the other of which is supported by the other guide, each tape having a permanent connection to the front end of the sunshade and apertures spaced along its length, the blade ends having projections that are received by certain of the apertures in the tape to cooperate therewith in providing the releasable connections, and the coupling mechanism including a coupling shaft that extends between the tapes and has a pair of toothed sprockets each of which is meshed with one of the apertured tapes.

5. A sunshade roof construction as in claim 4 wherein each guide includes a storage section that receives the ends of the sunshade blades in the stacked relationship with the sunshade in the open position, each guide storage section including a ramp where the blade end projections are received by and withdrawn from the tape apertures to make and uncouple the releasable connections of the tapes to the sunshade, the blade end projections being received by the tape apertures at the ramps to maintain the blades spaced from each other during movement to and from the closed position, and the blade end projections being withdrawn from the tape apertures at the ramps of the guide storage sections to permit storage of the blades in the stacked relationship with the sunshade in the open position.

6. A sunshade roof construction as in claim 5 wherein each tape has small apertures that mesh with the associated sprocket and also has large apertures that receive the projections of the blade ends.

7. A sunshade roof construction as in claim 5 or 6 wherein each guide has a horizontally opening groove that receives one of the tapes and adjacent ends of the blades.

8. A sunshade roof construction as in claim 7 wherein each guide also includes a tape stowage section that receives the associated tape with the sunshade in the open position.

9. A sunshade roof construction as in claim 8 wherein the coupling shaft includes a pair of shaft portions each of which has an outer end connected to one of the sprockets and an inner end located adjacent the inner end of the other shaft portion, and a coupling that rotatively couples the inner ends of the shaft portions.

10. A sunshade roof construction as in claim 9 wherein the coupling includes a spring biaser that forces the shaft portions away from each other.

11. A sunshade roof construction as in claim 1 wherein the vehicle roof has side rails that support the guides, the transparent roof panel extending between the roof side rails, and the sunshade being located at the rear of the transparent panel in the stored open position.

12. A sunshade roof construction as in claim 1 further including at least one tensioner connected to the flexible sheet-like shade to maintain a taut condition thereof in the closed position of the sunshade.

13. A sunshade roof construction as in claim 12 wherein the tensioner includes a spring and a connector that extends between the spring and the flexible sheet-like shade.

14. For use with a roof covering an occupant compartment, a sunshade roof construction comprising: a transparent roof panel through which the environment can be viewed from the occupant compartment; a sunshade mounted below the transparent roof panel and including a plurality of laterally elongated blades each of which has opposite ends; said sunshade also including a flexible sheet-like shade that connects the blades; a pair of guides supported below the transparent panel with each guide receiving one end of each blade to support the sunshade for movement between: a closed position where the blades are spaced from each other below the transparent roof panel with the flexible shade extending between the blades to cooperate therewith in shading the occupant compartment from the transparent roof panel, and an open position where the blades are stored in a stacked relationship with all of the blades located in single vertical stack at a location that exposes the occupant compartment to the transparent roof panel with portions of the flexible shade folded between the stacked blades; the sunshade having a front end including a handle that is manually grasped to move the sunshade between the closed and open positions; a coupling mechanism including a pair of tapes respectively supported by the pair of guides and having permanent connections to the front end of the sunshade adjacent its forwardmost blade; the flexible tapes having apertures; the ends of the rearward blades each having at least one projection; each guide including a storage section that receives the blade ends in the single vertical stack; each storage section including a ramp where certain of the tape apertures receive the projections of the blade ends to maintain the blades spaced from each other during movement to and from and while in the closed position; the blade end projections being withdrawn from the tape apertures at the ramps to permit the storage of the blades in the vertical stack with the portions of the flexible shade folded between the stacked blades; and a coupling shaft having a pair of toothed sprockets respectively meshed with the pair of tapes to coordinate the movement of the ends of the blades.

15. For use with a vehicle including a roof covering an occupant compartment, a sunshade roof construction comprising: a transparent roof panel through which the environment can be viewed from the occupant compartment; a sunshade mounted below the transparent roof panel and including a plurality of laterally elongated blade ends having projections; said sunshade also including a flexible sheet-like shade that connects the blades; a pair of guides supported below the transparent panel with each guide receiving one end of each blade to support the sunshade for movement between: a closed position where the blades are spaced from each other below the transparent roof panel with the flexible shade extending between the blades to cooperate therewith in shading the occupant compartment from the transparent roof panel, and an open position where the blades are stored in a stacked relationship with the flexible shade folded therebetween at a location that exposes the occupant compartment to the transparent roof panel; each guide including a storage section that receives the ends of the sunshade blades in the stacked relationship with the sunshade in the open position; the sunshade having a front end including a handle that is manually grasped to move the sunshade between the closed and open positions; a coupling mechanism including a pair of flexible tapes, a pair of toothed sprockets associated with the tapes, and a shaft that rotatively connects the sprockets; and said tapes having small apertures that mesh with the toothed sprockets and also having large apertures that receive the projections of the blade ends to move the sunshade between the open and closed positions.

16. For use with a vehicle including a roof covering an occupant compartment, a sunshade roof construction comprising: a transparent roof panel through which the environment can be viewed from the occupant compartment; a sunshade mounted below the transparent roof panel and including a plurality of laterally elongated blades each of which has opposite ends; said sunshade also including a flexible sheet-like shade that connects the blades; a pair of guides supported below the transparent panel with each guide receiving one end of each blade to support the sunshade for movement between: a closed position where the blades are spaced from each other below the transparent roof panel with the flexible shade extending between the blades to cooperate therewith in shading the occupant compartment from the transparent roof panel, and an open position where the blades are stored in a stacked relationship with all of the blades located in a single vertical stack at a location that exposes the occupant compartment to the transparent roof panel and with portions of the flexible shade folded between the stacked blades; a coupling mechanism including releasable connections for connecting to the blade ends to maintain the blades spaced from each other during movement to and from and while in the closed position, and the releasable connections of the coupling mechanism disconnecting from certain blade ends upon movement to the open position to permit the storage of the blades in the stacked relationship with the portions of the flexible shade folded between the blades; and a tensioner connected to the flexible sheet-like shade to maintain a taut condition thereof in the closed position of the sunshade.

* * * * *